(12) United States Patent
Ni

(10) Patent No.: US 10,012,503 B2
(45) Date of Patent: Jul. 3, 2018

(54) ELEVATION ANGLE ESTIMATING DEVICE AND METHOD FOR USER TERMINAL PLACEMENT

(71) Applicant: WorldVu Satellites Limited, St Helier, Jersey (GB)

(72) Inventor: Melvin S. Ni, Cupertino, CA (US)

(73) Assignee: WorldVu Satellites Limited, Arlington, VA (US)

( * ) Notice: Subject to any disclaimer, the term of this patent is extended or adjusted under 35 U.S.C. 154(b) by 397 days.

(21) Appl. No.: 14/737,489

(22) Filed: Jun. 12, 2015

(65) Prior Publication Data

US 2016/0363443 A1 Dec. 15, 2016

(51) Int. Cl.
*G01C 9/06* (2006.01)
*H01Q 1/12* (2006.01)

(52) U.S. Cl.
CPC ............... *G01C 9/06* (2013.01); *H01Q 1/125* (2013.01); *G01C 2009/066* (2013.01)

(58) Field of Classification Search
CPC .... G01C 9/06; G01C 2009/066; H04B 17/27; H01Q 1/125
See application file for complete search history.

(56) References Cited

U.S. PATENT DOCUMENTS

| 2,410,667 | A | 11/1946 | Luboshez |
| 2,949,808 | A | 8/1960 | Thurow |
| 5,159,401 | A | 10/1992 | Decker, Jr. |
| 5,541,726 | A | 7/1996 | Nakajima |
| 5,757,315 | A | 5/1998 | Aoki |
| 6,169,881 | B1 | 1/2001 | Astrom et al. |
| 6,313,865 | B1 | 11/2001 | Driscoll, Jr. et al. |
| 7,541,975 | B2 | 6/2009 | Sever et al. |
| 2006/0244749 | A1 | 11/2006 | Kondo et al. |
| 2008/0166011 | A1 | 7/2008 | Sever et al. |

(Continued)

FOREIGN PATENT DOCUMENTS

| WO | 9109325 A1 | 6/1991 |
| WO | 9957824 A2 | 11/1999 |

(Continued)

OTHER PUBLICATIONS

Officer: Lee W. Young, "International Search Report" dated Jun. 30, 2016 in related International PCT Application No. PCT/US16/25012, which is a counterpart of related U.S. Appl. No. 14/674,363.

(Continued)

*Primary Examiner* — Daniel Pihulic
(74) *Attorney, Agent, or Firm* — Kaplan Breyer Schwarz, LLP

(57) ABSTRACT

A device and method for estimating the elevation angle of one or more objects surrounding a user terminal, include a light-collecting lens arrangement that collects sky scene light from a wide angle, an eyepiece lens arrangement that collimates the sky scene light collected by the light-collecting lens arrangement, and an elevation limit marking that is superimposed over the sky scene light. The elevation limit marking defines an elevation angle above a horizon of the earth that all the one or more objects in a field of view of the device must remain below so that the user terminal has an unobstructed view of the sky in all azimuthal directions.

28 Claims, 13 Drawing Sheets

(56) References Cited

U.S. PATENT DOCUMENTS

| | | |
|---|---|---|
| 2009/0055776 A1 | 2/2009 | Audet |
| 2012/0121125 A1 | 5/2012 | Dimov |
| 2012/0249745 A1 | 10/2012 | Gagel et al. |
| 2012/0293678 A1 | 11/2012 | Amor Molares et al. |
| 2013/0014699 A1 | 11/2013 | Jungerman et al. |
| 2014/0161358 A1 | 6/2014 | O'Haire et al. |
| 2014/0340427 A1 | 11/2014 | Baker |
| 2016/0363443 A1* | 12/2016 | Ni .............. G01C 9/06 |

FOREIGN PATENT DOCUMENTS

| | | | |
|---|---|---|---|
| WO | 0074271 A1 | 12/2000 | |
| WO | 2006113689 A2 | 10/2006 | |
| WO | WO-2006113689 A2 * | 10/2006 | ............. G01S 19/28 |
| WO | WO-2016199110 A1 * | 12/2016 | ............... G01C 9/06 |

OTHER PUBLICATIONS

Authorized Officer: Blaine R. Copenheaver, "International Search Report" dated Jul. 12, 2016 in related International PCT Application No. PCT/US2016/026207, which is a counterpart of related U.S. Appl. No. 14/679,702.

Authorized Officer: Jens Huschelrath, "International Search Report" dated Aug. 31, 2016 in counterpart International PCT Application PCT/IB2016/053480.

Officer: Lee W. Young, "Written Opinion of the International Searching Authority" dated Jun. 30, 2016 in related International PCT Application No. PCT/US16/25012, which is a counterpart of related U.S. Appl. No. 14/674,363.

Authorized Officer: Blaine R. Copenheaver, "Written Opinion of the International Searching Authority" dated Jul. 12, 2016 in counterpart International PCT Application No. PCT/US2016/026207, which is a counterpart of related U.S. Appl. No. 14/679,702.

Authorized Officer: Jens Huschelrath, "Written Opinion of the International Searching Authority" dated Aug. 31, 2016 in counterpart International PCT Application PCT/IB2016/053480.

"Related U.S. Appl. No. 14/679,702", filed Apr. 6, 2015.

"Related U.S. Appl. No. 14/674,363", filed Mar. 31, 2015.

"Non Final Office Action" dated Dec. 7, 2017 issued in related U.S. Appl. No. 14/679,702.

"Non-Final Office Action", U.S. Appl. No. 14/679,702, dated Apr. 6, 2017, 29 pp.

"Non-Final Office Action", U.S. Appl. No. 14/674,363, dated Sep. 7, 2017 6 pp.

Officer Lingfei Bai, "International Preliminary Report on Patentability", International Patent Application PCT/US2016/026207, Issuance of Report dated Oct. 10, 2017, 8 pp.

Officer Agnes Wittman-Regis, "International Preliminary Report on Patentability", International Patent Application PCT/US2016/025012, Issuance of Report dated Oct. 12, 2017, 8 pp.

* cited by examiner

ELEVATION ANGLE ESTIMATING DEVICE AND METHOD FOR USER TERMINAL PLACEMENT

FIELD

The present disclosure relates to user terminals of non-geostationary satellite communications systems. More particularly, the present disclosure relates to a device and method for estimating the elevation angle of one or more objects surrounding a user terminal to help the user properly position the user terminal so that it has an unobstructed view of the sky.

BACKGROUND

Satellite systems for bringing low-cost broadband internet service to any location on the earth are currently being developed. Such systems typically include gateway antennas that link the internet to a fleet of non-geostationary satellites, which in turn link to inexpensive user terminals positioned on the earth. The user terminals deliver internet connectivity to residences and businesses.

The inexpensive user terminal mentioned above, includes an antenna that requires an unobstructed view over a large section of the sky in all azimuthal directions (north, south, east, and west directions) in order to receive uninterrupted service from the satellites. Trees, buildings, and mountains must remain below a certain elevation angle (the angle above the horizon i.e., the line at which the earth and sky appear to meet) in all the azimuthal directions. In some parts of the world, the maximum elevation angle can be as low as about 45 degrees. An example of such a user terminal is described in U.S. application Ser. No. 14/627,577, filed Feb. 20, 2015 and entitled "User Terminal Having A Linear Array Antenna With Electronic And Mechanical Actuation System."

Individual users with a minimum of expertise are likely to be mounting and installing the user terminal, therefore, it is essential that they be able to position the user terminals at their residences, business, and the like, in such a way that the user terminal has an unobstructed view of the sky.

To maintain low-cost internet service, the user should be capable of locating, mounting, installing, and positioning their user terminal without professional assistance. Because the user terminal must have an unobstructed view of the sky in all azimuthal directions, down to an elevation angle of about 45 degrees above the horizon in some applications, the ability of the user to locate and position their user terminal correctly is a significant challenge. Currently, users located and position their user terminal by visually estimating whether the terminal has an unobstructed view of the sky, which often leads to errors of up to 10 degrees and issues with dropout periods. Surveying equipment can be used to help locate and position the user terminals correctly, but such equipment is expensive and requires specialized skill to operate.

The problem with respect to providing an unobstructed view of the sky for the user terminal, is new in the area of telecommunications. Older wireless communication networks used lower radio frequencies that were unaffected by trees, buildings and similar obstructions. Newer communication systems operating at higher frequencies only require an antenna to have a clear view along one unchanging line-of-sight to a geostationary satellite. However, inexpensive user terminals, such as the one described in U.S. application Ser. No. 14/627,577 require an unobstructed view of the sky in all azimuthal directions in order to avoid unacceptably long dropout periods caused by blocked portions of the sky.

Accordingly, an inexpensive and easy-to-use device and method are needed for allowing a user to accurately estimate the elevation angle of one or more surrounding objects so that the user can locate and position a user terminal of a non-geostationary satellite communications system so that it has an unobstructed view of the sky in all azimuthal directions down to an elevation angle of about 45 degrees.

SUMMARY

Disclosed herein is a device for estimating the elevation angle of one or more objects surrounding a user terminal. The device, in various embodiments, may comprise a light-collecting lens arrangement for collecting sky scene light from a wide angle, an eyepiece lens arrangement for collimating the sky scene light collected by the light-collecting lens arrangement, and an elevation limit marking superimposed over the sky scene light. The elevation limit marking defines an elevation angle above a horizon of the earth that all the one or more objects in a field of view of the device must remain below so that the user terminal has an unobstructed view of the sky in all azimuthal directions.

In some embodiments, the elevation angle defined by the elevation limit marking comprises a maximum elevation angle.

In some embodiments, the device may further comprise an image-reflecting surface for reflecting the sky scene light onto the light-collecting lens arrangement.

In some embodiments, the image-reflecting surface may include the elevation limit marking.

In some embodiments, a periphery of the image-reflecting surface may define the elevation limit marking.

In some embodiments, the elevation limit marking may have an elliptical shape.

In some embodiments, the device may further comprise an image-reflecting surface for reflecting the sky scene light collimated with the eyepiece lens arrangement, onto a user's eye.

In some embodiments, the device may further comprise an image-reflecting surface for reflecting the sky scene light collected with the light-collecting lens arrangement, onto the eyepiece lens arrangement.

In some embodiments, the device may further comprise a transparent sighting surface, the transparent sighting surface including the elevation limit marking.

In some embodiments, the elevation limit marking may have a circular shape.

In some embodiments, the image-reflecting surface may comprise a mirror.

In some embodiments, the light-collecting lens arrangement may comprise a concave lens.

In some embodiments, the concave lens may comprise a simple lens or a compound lens.

In some embodiments, the eyepiece lens arrangement may comprise a convex lens.

In some embodiments, the convex lens may comprise a simple lens or a compound lens.

In some embodiments, the device may further comprise an auxiliary lens arrangement for extending a field of view of the device.

In some embodiments, the auxiliary lens arrangement may comprise a convex-concave lens.

In some embodiments, the convex-concave lens may comprise a simple lens or a compound lens.

In some embodiments, the device may further comprise a housing, the light collecting lens arrangement and the eyepiece lens arrangement disposed in the housing, the housing, the light collecting lens arrangement and the eyepiece lens arrangement forming an optical unit.

In some embodiments, the auxiliary lens arrangement may be disposed in the housing of the optical unit.

In some embodiments, the device further comprises a base, the optical unit mounted on the base.

In some embodiments, the image-reflecting surface may be mounted on the base and optically aligned with the optical unit.

In some embodiments, the device may further comprise a stand, the base mounted on the stand, the stand allowing the base to be rotated relative to the stand.

Further disclosed herein is a user terminal. The user terminal, in various embodiments, may comprise a housing, an antenna associated with the housing, and the above-described device disposed on or integrated into the housing of the user terminal.

Further disclosed herein is a method for estimating the elevation angle of one or more objects surrounding a user terminal. The method, in various embodiments, may comprise superimposing an elevation limit marking over sky scene light, the elevation limit marking defining an elevation angle above a horizon of the earth that all the one or more objects must remain below so that the user terminal has an unobstructed view of the sky in all azimuthal directions; collecting the sky scene light from a wide angle with a light-collecting lens arrangement that is disposed on, attached to, disposed in, or disposed adjacent, to the user terminal; and viewing the sky scene light to ascertain the location of each of the one or more objects in the image relative to the elevation limit marking.

DETAILED DESCRIPTION

Figure 1:
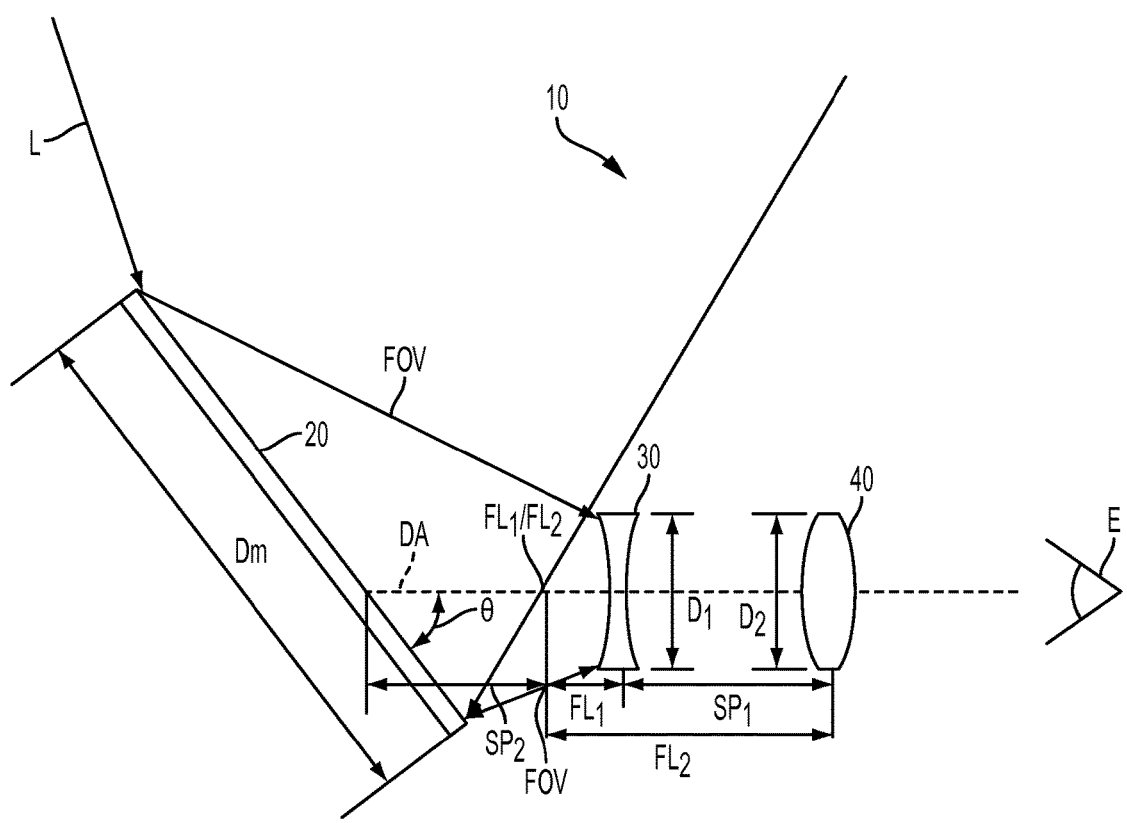
FIG. 1 is a schematic illustration of an embodiment of an elevation angle estimating device according to the present disclosure.

FIG. 1 illustrates an embodiment of an elevation angle estimating device 10 of the present disclosure. The device 10 allows a user to accurately estimate the elevation angle of one or more surrounding objects by viewing the sky through the device 10. The device 10 comprises a planar image-reflecting surface 20, a light-collecting lens arrangement 30 optically aligned with the image-reflecting surface, and an eyepiece lens arrangement 40 optically aligned with the light-collecting lens 30 arrangement.

The planar image-reflecting surface 20 is inclined at an angle θ relative to the optical axis OA of the light-collecting and eyepiece lens arrangements 30, 40 so that it reflects sky scene light L (including any objects within the field of view (FOV) of the image-reflecting surface 20) laterally onto the light-collecting lens arrangement 30. In some embodiments, the image-reflecting surface 20 may be inclined at a 45 degree angle (angle θ) relative to the optical axis OA. The planar image-reflecting surface 20, in various embodiments, may comprise a flat circular mirror or any other suitable device or apparatus that is capable of reflecting the sky scene light L onto the light-collecting lens arrangement 30.

In some embodiments, the image-reflecting surface 20 may include an elevation limit marking 22 (FIGS. 2A-2C) that represents the maximum elevation angle above the horizon that objects surrounding the device 10 (and therefore, a user terminal), such as trees, buildings, mountains, and other structures in the FOV of the device 10, must remain below so that the user terminal has an unobstructed view of the sky in all azimuthal directions and, therefore, can receive uninterrupted service from the satellites. Because the image-reflecting surface 20 is disposed at the angle θ relative to the optical axis OP, the elevation limit marking may be an elliptical-shape marking having pre-determined long and short axes so that marking appears as a circular-shape marking to the light-collecting lens arrangement 30.

The light-collecting lens arrangement 30 collects the sky scene light L reflected from the image-reflecting surface 20 and channels the light L onto the eyepiece lens arrangement 40. The light-collecting lens arrangement 30 is configured to collect sky scene light L from wide angles (FOV). In some embodiments, the light collecting lens arrangement 30 may comprise a concave lens. The concave lens can be constructed as a simple lens comprising a single piece of glass or plastic, or as a compound lens comprising two or more simple lens elements. In a preferred embodiment, the concave lens has a focal length that provides a FOV greater than 90 degrees so that it can collect sky scene light L from a wide angle or FOV. Because light rays from distant objects across the FOV are separated by wide angles, the light rays will be more parallel in the space between the light-collecting lens arrangement 30 and the eyepiece lens arrangement 40. After passing through the eyepiece lens arrangement 40, the light rays from distant objects converge once again as they enter the eye, but at much smaller separation angles. Thus, the eye perceives distant and widely separated objects as appearing less separated.

Light from any single distant point comes into the light-collecting lens arrangement 30 nearly collimated. The light collecting lens arrangement 30 has the effect of diverging these light rays as they approach the eyepiece lens arrangement 40. The eyepiece lens arrangement 40 collimates or makes parallel the diverging light rays exiting the light-collecting lens arrangement 30 so that the user can easily observe or view the sky through the device 10. Specifically, the objects will still look distant so the user's relaxed eye E can see them. In some embodiments, the eyepiece lens arrangement 40 may comprise a convex lens. The convex lens can be constructed as a simple lens comprising a single piece of glass or plastic, or as a compound lens comprising two or more simple lens elements.

Referring still to FIG. 1, in some embodiments of the device 10, the light-collecting lens arrangement 30 may have a diameter D1 of about 0.50 inches and the eyepiece lens arrangement 40 may have a diameter $D_2$ of about 0.50 inches. In such embodiments, the focal length $FL_1$ of the light-collecting lens 30 arrangement (measured between the focal point $FP_1$ and center of the light-collecting lens arrangement 30) can be about 0.25 inches and the focal length $FL_2$ of the eyepiece lens arrangement 40 (measured between the focal point $FP_2$ and center of the eyepiece lens arrangement 40) can be about 1.25 inches. The spacing $SP_1$ between the light-collecting lens arrangement 30 and the eyepiece lens arrangement 40 can be about 1.0 inches. The spacing $SP_2$ between the center of the image-reflecting surface 20 and the light-collecting lens arrangement 30 can be about 0.5 inches. The diameter $D_M$ of the light-reflecting surface 20 can be about 2.0 inches or a diameter that is large enough to occupy at least +/−45 degrees (equivalently 90 degrees) of the device's FOV. In other embodiments of the device, the component diameters, focal lengths, and spacings can be other dimensions.

The elevation limit marking 22 (illustrated in FIGS. 2A-2C) represents the locus of points at which obstructions exceed the maximum allowable elevation angle. In other words, the elevation limit marking 22 defines a maximum elevation angle above the horizon that objects surrounding the device (and therefore, the user terminal), such as trees, buildings, mountains, and other structures in the FOV of the device 10, must remain below so that the user terminal has an unobstructed view of the sky in all azimuthal directions and, therefore, can receive uninterrupted service from the satellites.

The elevation limit marking 22 can comprise, without limitation, a dark-colored marking printed on an outer surface 20o of the image-reflecting surface 20. In other embodiments, the elevation limit marking 22 can comprise a ridge, a bead, or a groove formed in or on the outer surface 20o of the image-reflecting surface 20, and any combination thereof. In a preferred embodiment, the long and short axes of the elliptical-shape elevation limit marking 22 and the diameter $D_M$ of the inclined image-reflecting surface 20 are selected to form a circular reflected image of the elevation limit marking 22 when viewed by the user in the eyepiece lens arrangement 40, which defines a maximum elevation angle of 45 degrees, +/−1.0 degree. In other embodiments, the long and short axes of the elevation limit marking 22 and the diameter $D_M$ of the image-reflecting surface 20 may be selected to form a circular reflected image of the elevation limit marking 22 that defines any other desirable maximum elevation angle above or below 45 degrees. In some embodiments of the image-reflecting surface 20 can comprise two or more concentric elevation limit markings (not illustrated) of differing dimensions that correspond to different maximum elevation angles above the horizon that objects surrounding the device must remain below.

In some embodiments, the elevation limit marking can be omitted and the planar image-reflecting surface 20 can be constructed to have an elliptical-shape peripheral edge that represents the maximum elevation angle (which in preferred embodiments defines a maximum elevation angle of 45 degrees, +/−1.0 degree). The elliptical-shape peripheral edge of the image-reflecting surface would appear circular in the eyepiece lens arrangement 40 due to the inclined angle at which the image-reflecting surface 20 lies relative to the light collecting lens arrangement 30.

Figure 2A:
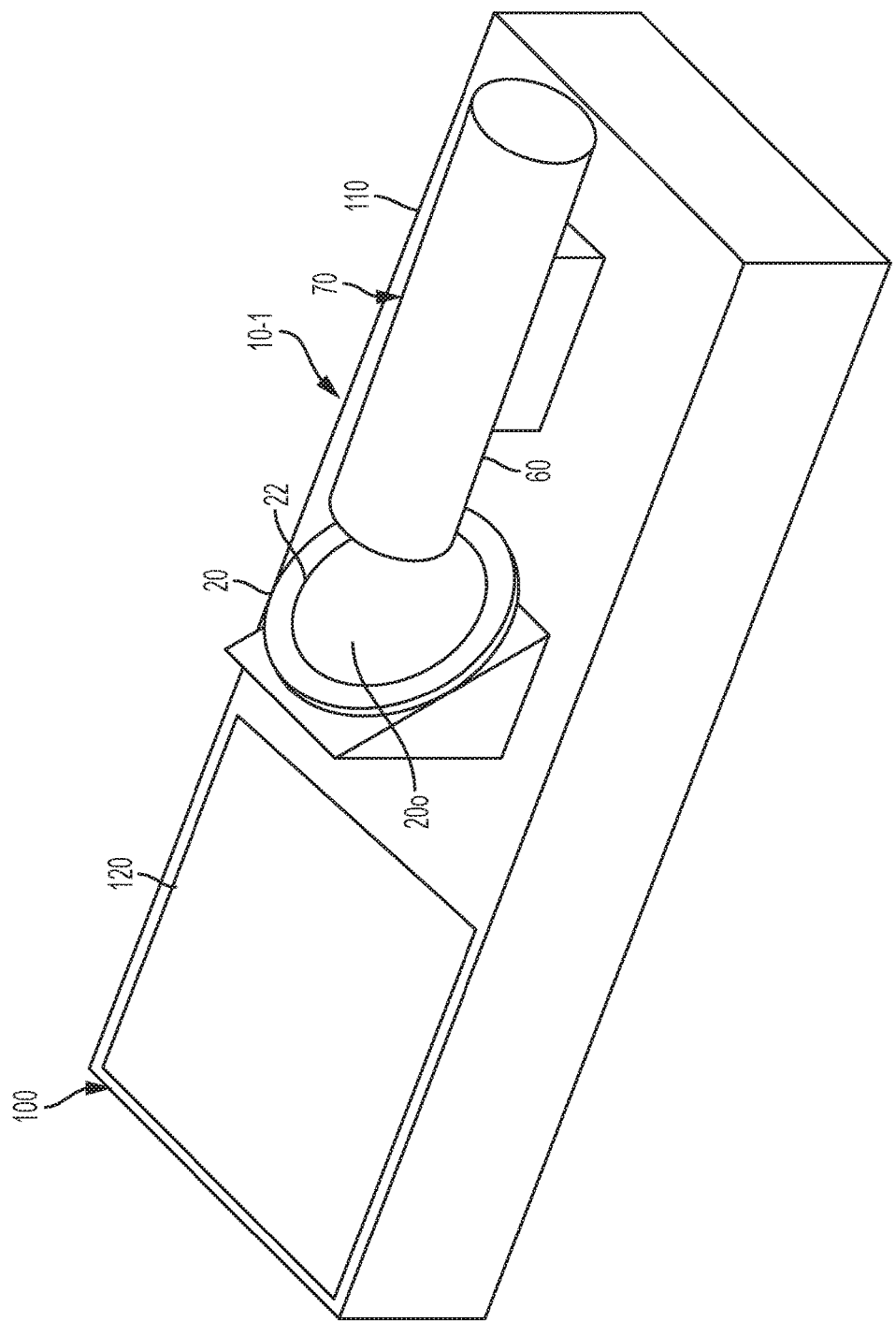
FIG. 2A is a perspective view of an embodiment of a user terminal which incorporates an embodiment of the elevation angle estimating device.

As illustrated in FIG. 2A, some embodiments of the elevation angle estimating device 10-1 can be an integral component of a user terminal 100, as illustrated in FIG. 2A. An example of such a user terminal is described in U.S. application Ser. No. 14/627,577, filed Feb. 20, 2015 and entitled "User Terminal Having A Linear Array Antenna With Electronic And Mechanical Actuation System." The entire disclosure of U.S. application Ser. No. 14/627,577 is incorporated herein by reference. In such embodiments, the elevation angle estimating device 10-1 can be integrated into a housing 110 of the user terminal 100 adjacent to the antenna 120 thereof. In the embodiment shown in FIG. 2A, the light-collecting and eyepiece lens arrangements (not illustrated) may be mounted in a tubular housing 60 (in optical alignment with one another), thereby forming an optics unit 70. The image-reflecting surface 20 and the optics unit 70 may be integrated into the housing 110 of the user terminal so that the image-reflecting surface 20 and the light-collecting lens arrangement of the optic units 70 are optically aligned with one another.

Figure 2B:
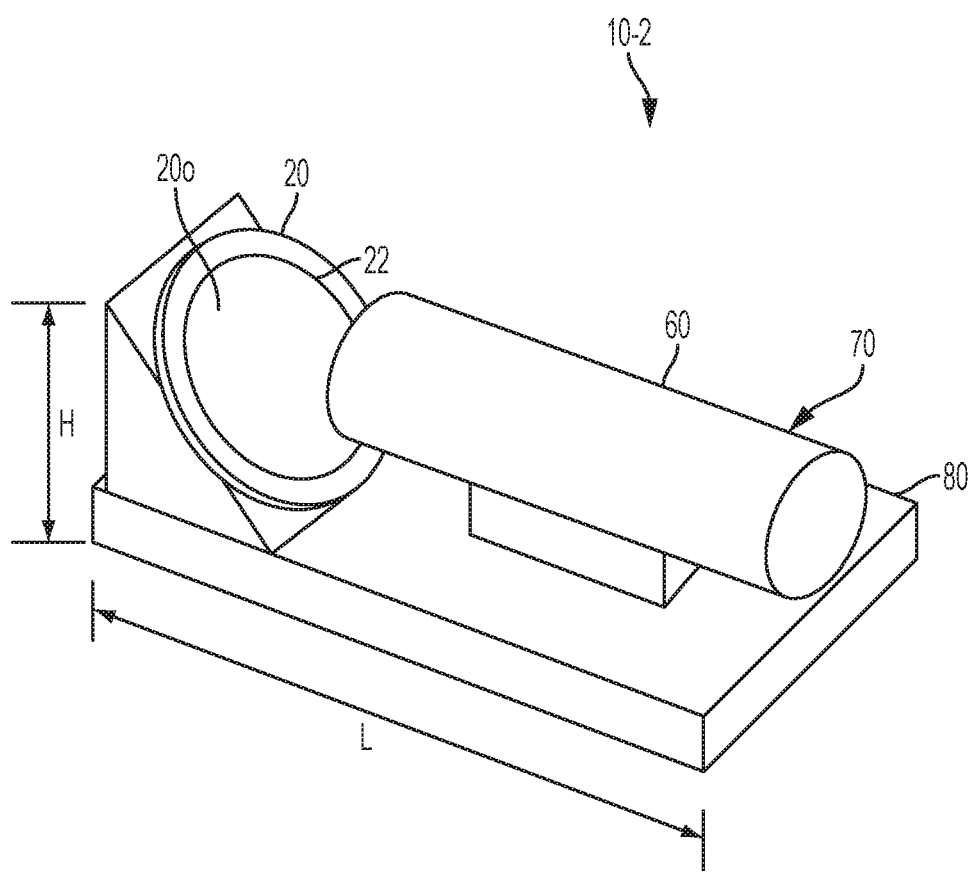
FIG. 2B is a perspective view of another embodiment of the elevation angle estimating device.

Referring to FIG. 2B, other embodiments of the elevation angle estimating device 10-2 may be configured as a portable device that can be removably mounted on or next to the user terminal. In one embodiment, the device 10-2 can have a length L of about 2.5 inches and a height of about 1.5 inches (embodiments of the device which are integrated into the user terminal may have similar dimensions). In any case, it should be understood that in other embodiments, the device may have other dimensions. In the embodiment shown in FIG. 2B, the light-collecting and eyepiece lens arrangements (not illustrated) may also be mounted in the previous described tubular housing 60 to form the optics unit 70. The image-reflecting surface 20 and the optics unit 70 may be mounted on a platform 80 so that the image-reflecting surface 20 and the light-collecting lens arrangement (not visible) are optically aligned with one another.

Figure 2C:
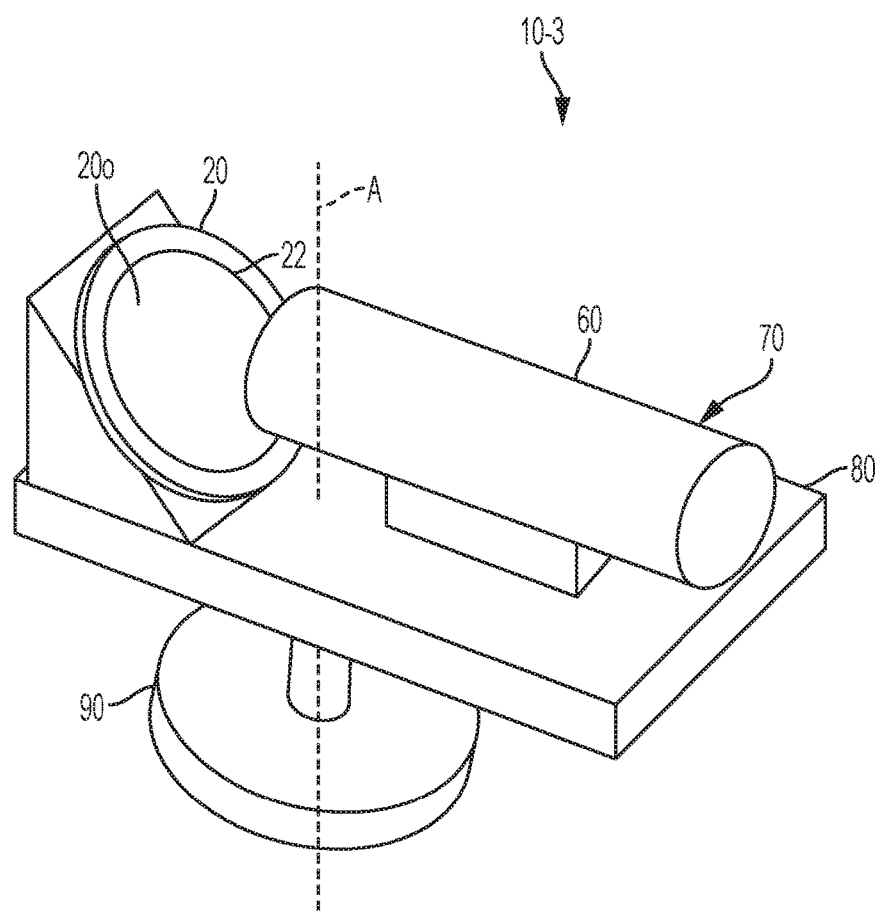
FIG. 2C is a perspective view of another embodiment of the elevation angle estimating device.

As illustrated in FIG. 2C, the device 10-3 can provided with an optional stand or azimuth rotation stage 90 on which the platform 80 of the device 10-3 is mounted. The azimuth stage 90 allows the platform 80 of the device 10-3 to be rotated at least 360 degrees about axis A relative to the azimuth stage 90. The azimuth stage 90 is particularly useful in compact embodiments of the device (e.g., less than 2.0 inches in length) that may have a small amount of self-obstruction. The azimuth stage 90 allows the user to take multiple sightings at different angles of rotation to overcome the self-obstruction. The azimuth stage 90 may also be provided in embodiments where self-obstruction is not an issue, for example, if the device 10-3 is on one side of the user terminal and the user is on the other side.

In other embodiments, self-obstruction can be avoided by increasing the spacing between the image-reflecting surface 20 and the light-collecting lens arrangement 30. In such embodiments, the diameter $D_M$ of the image-reflecting surface 20 will likely have to be increased to cover the same FOV.

Figure 3:
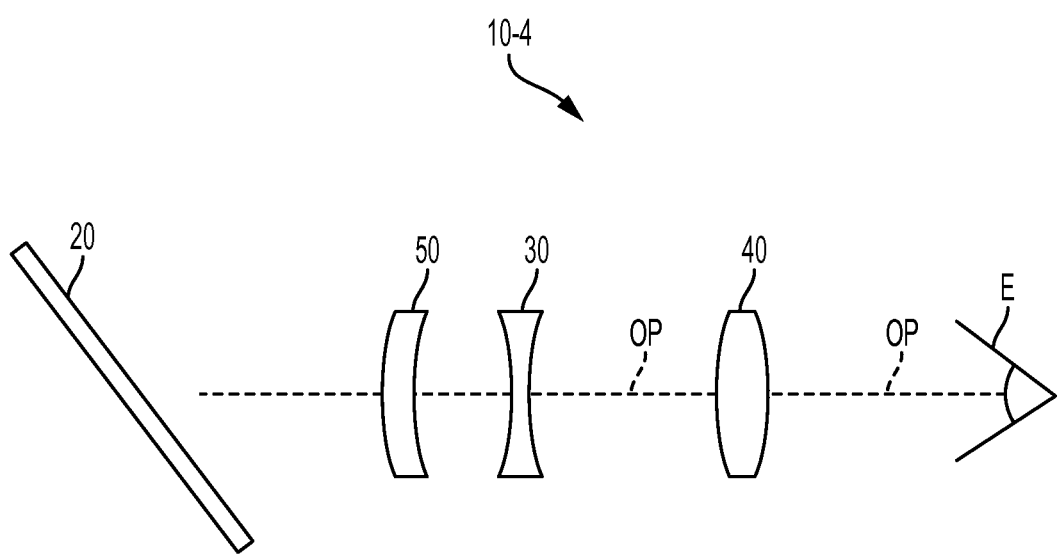
FIG. 3 is a schematic illustration of another embodiment of the elevation angle estimating device.

As illustrated in FIG. 3, an auxiliary lens arrangement 50 may be provided in the optical path OP between the inclined image-reflecting surface 20 and the light-collecting lens arrangement 30 in embodiments of the device 10-4 to supplement the light-collecting lens arrangement 30 where an extended FOV is desired. In such embodiments, the auxiliary lens arrangement 50 may comprise a convex-concave lens. The convex-concave lens 50 can be constructed as a simple lens comprising a single piece of glass or plastic where the convex surface faces the image-reflecting surface and the concave surface faces the light-collecting lens arrangement 30. In other embodiments, the convex-concave lens 50 can comprise a compound lens comprising two or more simple lens elements. The auxiliary lens arrangement 50 can be mounted in the earlier described tubular housing 60 of the optics along unit 70 (FIGS. 2A-2C) with the light-collecting and eyepiece lens arrangements 30, 40.

Figure 4A:
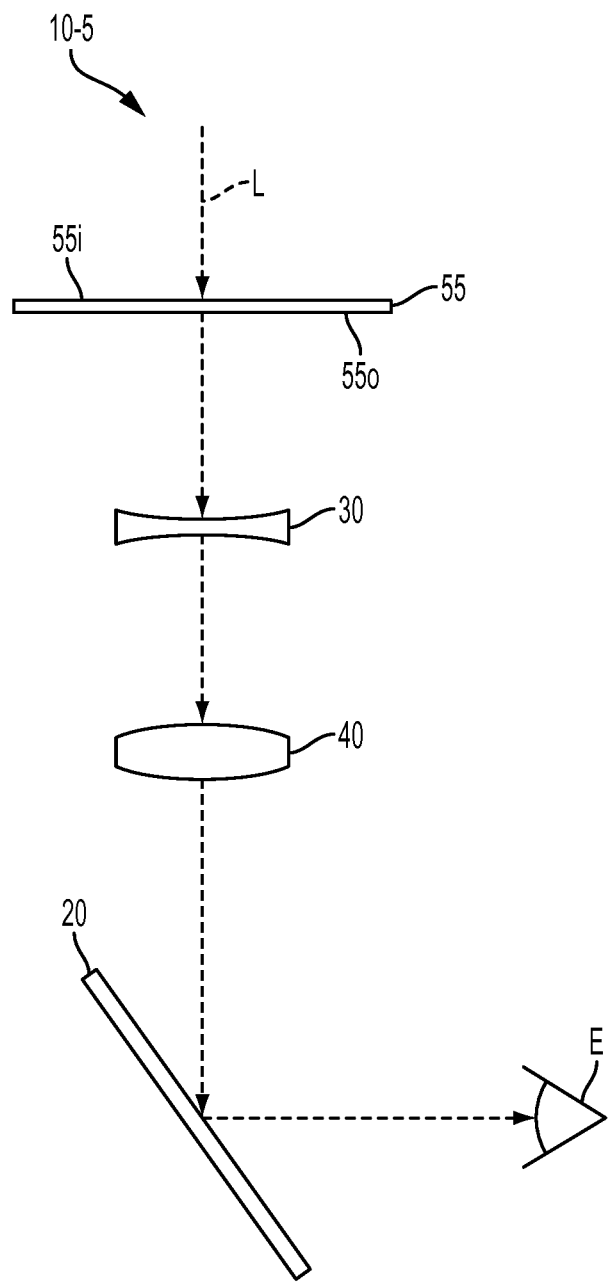
FIG. 4A is a schematic illustration of another embodiment of the elevation angle estimating device.
Figure 4B:
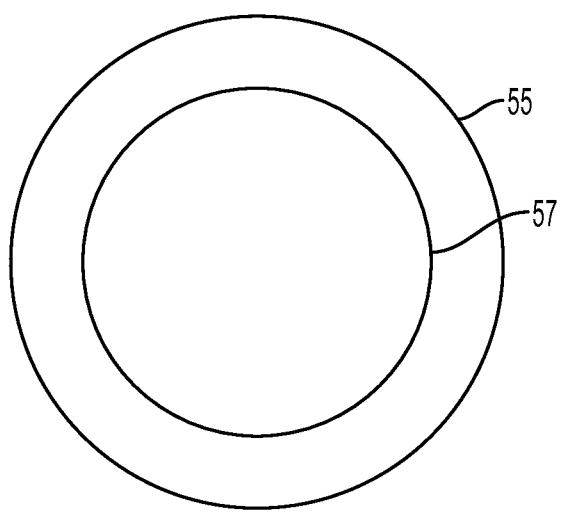
FIG. 4B is a top plan view of an embodiment of a transparent sighting surface of the elevation angle estimating device of FIG. 4A.

FIG. 4A illustrates another embodiment of the elevation angle estimating device 10-5 of the present disclosure. In this embodiment, the inclined planar image-reflecting surface 20 is disposed between the eyepiece lens arrangement 40 and the user's eye E. The image-reflecting surface 20 reflects the collimated sky scene light L exiting the eyepiece lens arrangement 40 laterally toward the user's eye E. Further, a transparent sighting surface 55 is provided in this embodiment. The sighting surface 55 is optically aligned with and disposed vertically above the light-collecting lens arrangement 30. In some embodiments, the sighting surface 55 may comprise a planar transparent glass or plastic screen. As illustrated in FIG. 4B, the sighting surface 55 further comprises a circular elevation limit marking 57 of a predetermined diameter. The diameter of the elevation limit marking 57 is selected so that when the user views the elevation limit marking 57 in the image-reflecting surface 20, the elevation limit marking 57 defines a maximum elevation angle above the horizon that objects surrounding the device 10-5 (and therefore, a user terminal), such as trees, buildings, mountains, and other structures in the field of view (FOV) of the device 10, must remain below so that the user terminal has an unobstructed view of the sky in all azimuthal directions and, therefore, can receive uninterrupted service from the satellites. The elevation limit marking 57 can comprise, without limitation, a dark-colored circle printed on an outer surface 55o or inner surface 55i of the sighting surface 55, a circular ridge, bead, or groove formed in or on the outer surface 55o or inner surface 55i of the sighting surface 55, and any combination thereof. In some embodiments, the sighting surface 55 can comprise two or more circular concentric elevation limit markings (not illustrated) of differing diameters corresponding to different maximum elevation angles above the horizon that objects surrounding the device 10-5 must remain below. In some embodiments, the device 10-5 can include the auxiliary lens arrangement described earlier (e.g., convex-concave lens) which provides an extended FOV. The auxiliary lens arrangement may be provided in the optical path between the transparent sighting surface 55 and the light-collecting lens arrangement 30.

Figure 4C:
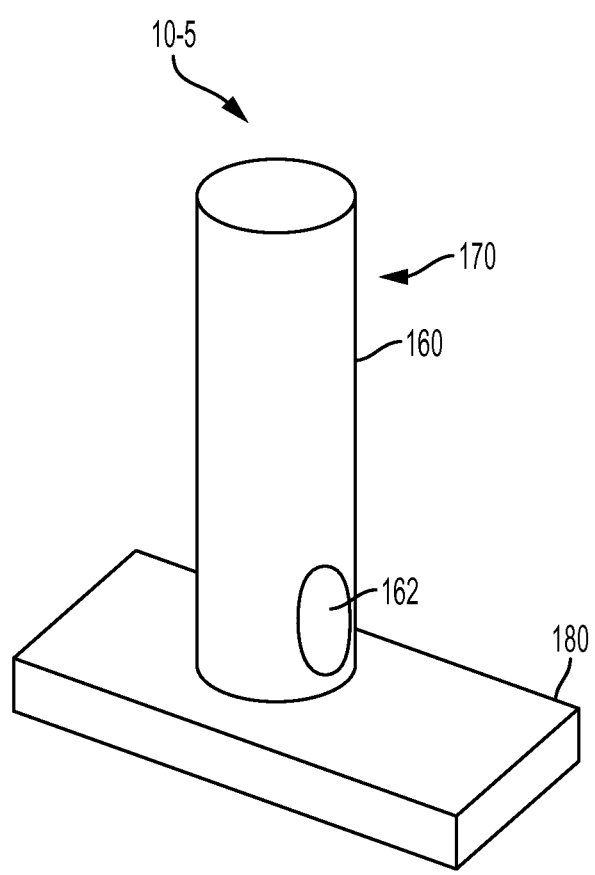
FIG. 4C is a top plan view of the embodiment of the elevation angle estimating device of FIG. 4A.

As illustrated in FIG. 4C, the sighting surface 55, the light-collecting lens arrangement 30, the eyepiece lens arrangement 40 and the inclined planar image-reflecting surface 20 can be mounted in a tubular housing 160 to form an optics unit 170. The tubular housing 160 can include a lateral user viewing window or aperture 162 disposed adjacent to the inclined planar image-reflecting surface 20 for viewing the sky scene reflected with the image-reflecting surface 20. The optics unit 170 can be mounted on a base or platform 180 (as illustrated) or integrated into the housing of the user terminal. The auxiliary lens arrangement which provides an extended FOV can also be provided within the tubular housing 160 of the optics unit 170.

Figure 5A:
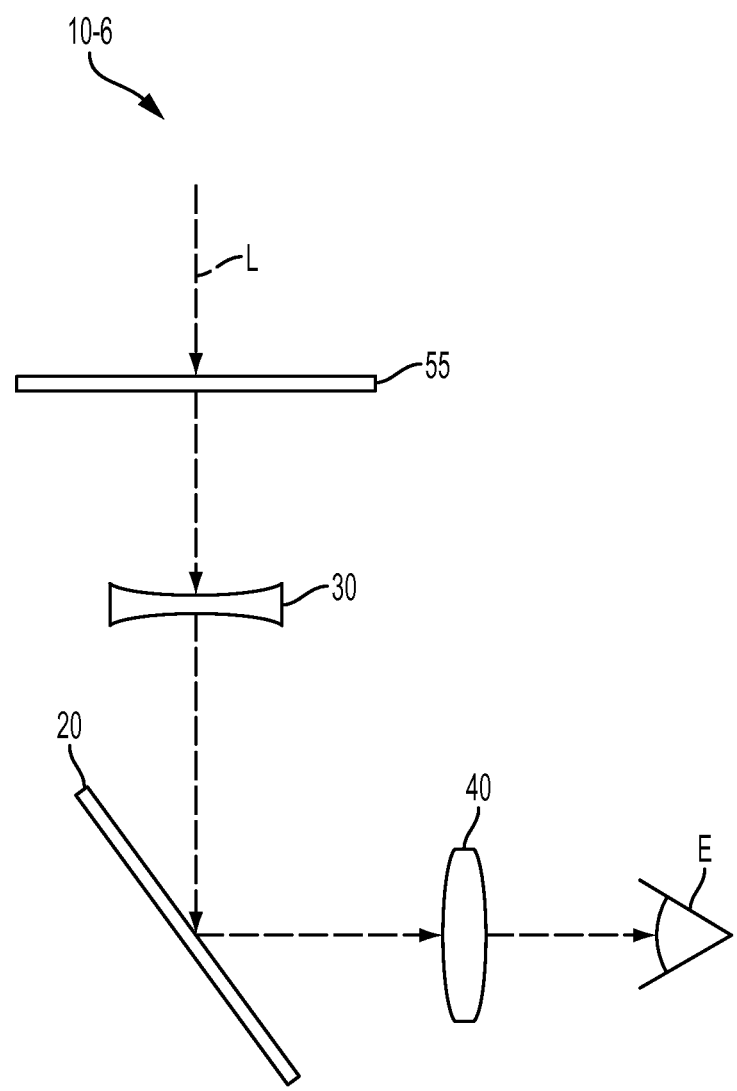
FIG. 5A is a schematic illustration of another embodiment of the elevation angle estimating device.

FIG. 5A illustrates another embodiment of the elevation angle estimating device 10-6 of the present disclosure. This embodiment of the device 10-6 is similar to the embodiment illustrated in FIGS. 4A-4c, in that it comprises the earlier described sighting surface 55 with the circular elevation limit marking 57 (FIG. 4B), the light-collecting lens arrangement 30, the inclined planar image-reflecting surface 20 and the eyepiece lens arrangement 40. The inclined planar image-reflecting surface 20 of the device 10-6, however, is disposed between the light-collecting lens arrangement 30 and the eyepiece lens arrangement 40. The image-reflecting surface 20 reflects the diverging sky scene light L exiting the light-collecting lens arrangement 30 laterally toward the eyepiece lens arrangement 40.

Figure 5B:
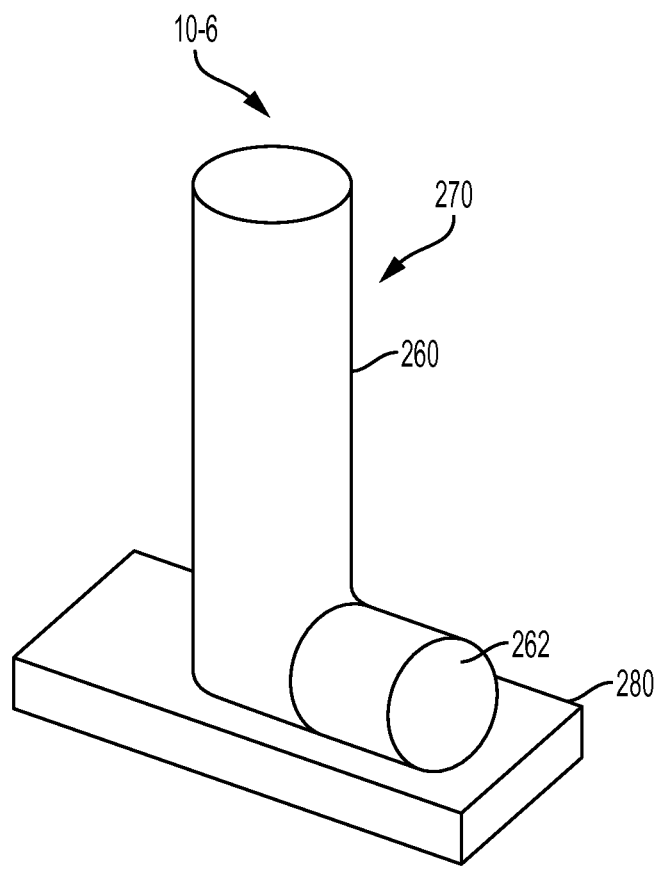
FIG. 5B is a top plan view of the embodiment of the elevation angle estimating device of FIG. 5A.

As illustrated in FIG. 5B, the sighting surface 55, the light-collecting lens arrangement 30, the inclined planar image-reflecting surface 20, and the eyepiece lens arrangement 40 can be mounted in a tubular housing 260 to form an optics unit 270. The tubular housing 260 can include a user viewing window or aperture 262 for viewing the sky scene light collimated with the eyepiece lens arrangement 40. The optics unit 270 can be mounted on a base or platform 280 (as illustrated) or integrated into the housing of the user terminal. The auxiliary lens arrangement which provides an extended FOV can also be provided within the tubular housing 260 of the optics unit 270.

The use and operation of the elevation angle estimating device of the present disclosure will now be described. Prior to using the device, the user should locate and position the user terminal so that the antenna is level (relative to the ground). Any conventional level indicating instrument, such as a bubble level, can be used to determine whether the antenna is level. Such an instrument can be separate from or integrated into the housing of the user terminal. As illustrated in FIG. 2A, if the device 10-1 is integrated into the user terminal 100, the device 10-1 should be level when the antenna 120 is level. As illustrated in FIGS. 2B, 2C, 4C, and 5B, if the device 10-2, 10-3, 10-4, and 10-5 is separate from the user terminal 50, the device 10-2, 10-3, 10-4, and 10-5 should be placed on the housing of the user terminal and leveled along with the antenna.

Figure 6A:
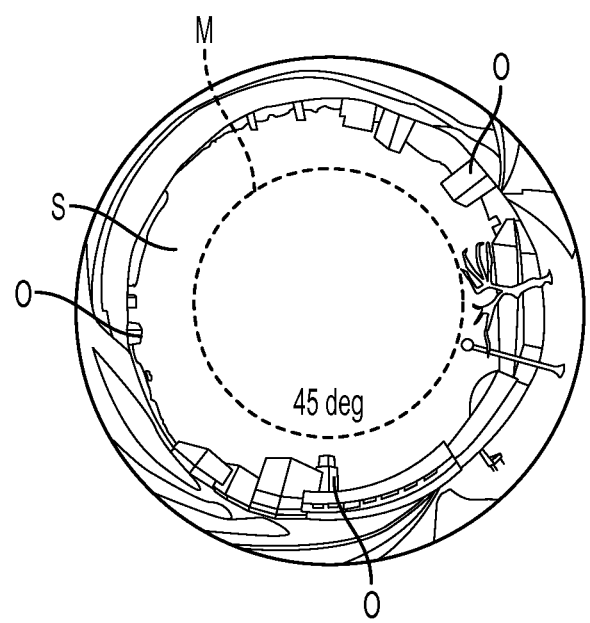
FIG. 6A is a view of the sky scene as seen by a user through the eyepiece of the device or as seen by the user in the inclined planar reflecting surface of the device, which illustrates when the user terminal has been properly located and positioned.
Figure 6B:
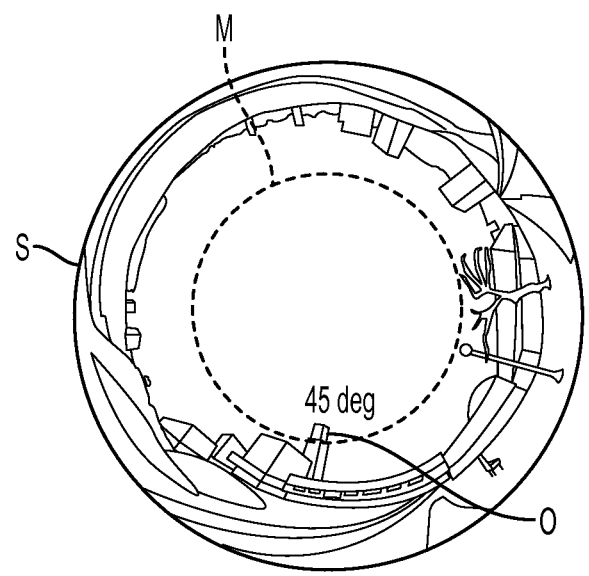
FIG. 6B is a view of the sky scene as seen by a user through the eyepiece of the device or as seen by the user in the inclined planar reflecting surface of the device, which illustrates device when the user terminal has been improperly located and positioned.

Once the user terminal and the device have been leveled, the user views the sky scene through the eyepiece lens arrangement 40 of the device 10, 10-4, and 10-6 (FIGS. 1, 3, and 5A) or in the inclined planar reflecting surface 20 of the device 10-5 (FIG. 4A). As illustrated in FIG. 6A, the proper location and position of the user terminal is confirmed, if each one of the one or more of the objects O in the sky scene S surrounding the user terminal are substantially outside of the superimposed elevation limit marking M, thereby indicating that the objects in the FOV of the device (and therefore the user terminal), are estimated to be below a desired maximum elevation angle. Consequently, the user terminal has an unobstructed view of the sky in all azimuthal directions. If a portion of at least one of the one or more of the objects O in the sky scene S is substantially inside the superimposed elevation limit marking M as illustrated in FIG. 6B, that object O is estimated to be above the desired maximum elevation angle. Consequently, the user terminal has an obstructed view of the sky in at least one azimuthal direction. Accordingly, the user terminal should be repositioned, or relocated and positioned so that each of the objects O in the sky scene S is substantially outside of the superimposed elevation limit marking M.

The elevation angle estimating device of the present disclosure allows the user to estimate the elevation angle of surrounding objects to an accuracy of about 1 to 2 degrees, assuming the user terminal is level. Accordingly, the device allows the user to estimate the elevation angle of surrounding objects with about 10 times the accuracy of prior art estimation methods where the user directly estimates the elevation angles of objects using only their eyes.

Figure 7:
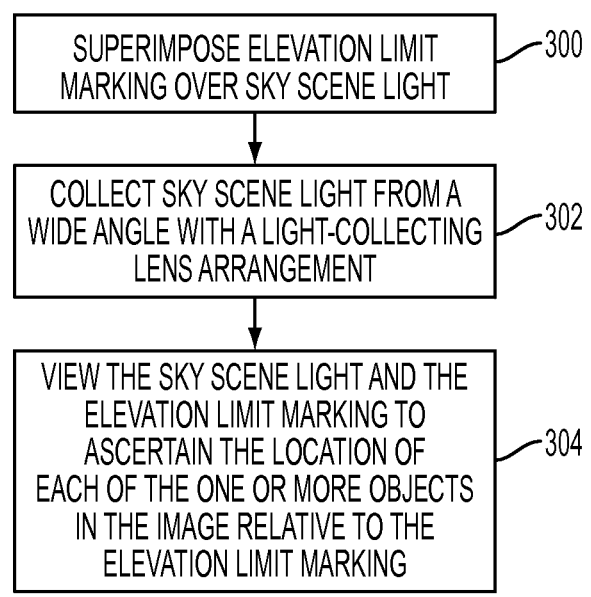
FIG. 7 is a flowchart illustrating an embodiment of a method for estimating the elevation angle of one or more objects surrounding a user terminal with the device of the present disclosure.

FIG. 7 is a flowchart illustrating an embodiment of a method for estimating the elevation angle of one or more objects surrounding a user terminal with the device of the present disclosure. In block 300, an elevation limit marking is superimposed over sky scene light. As described earlier, the elevation limit marking defines an elevation angle above a horizon of the earth that all the one or more objects must remain below so that the user terminal has an unobstructed view of the sky in all azimuthal directions. In block 302, the sky scene light is collected from a wide angle with a light-collecting lens arrangement that is disposed on, attached to, disposed in, or disposed adjacent, to the user terminal. In block 304, the sky scene light and elevation limit marking are viewed to ascertain the location of each of the one or more objects in the image relative to the elevation limit marking. If each one of the one or more objects is substantially outside the elevation limit marking, all the one or more objects are estimated to be below the elevation angle, and if a portion of any one of the one or more objects is substantially inside the reflected image of the elevation limit marking, that object is estimated to be above the elevation angle.

Although the elevation angle estimating device and method have been described in terms of illustrative embodiments, they are not limited thereto. Rather, the appended claims should be construed broadly to include other variants and embodiments of same, which may be made by those skilled in the art without departing from the scope and range of equivalents of the device and method.

What is claimed is:

1. A device for estimating the elevation angle of one or more objects surrounding a user terminal, the device comprising:
    a light-collecting lens arrangement for collecting sky scene light from a wide angle;
    an eyepiece lens arrangement for collimating the sky scene light collected by the light-collecting lens arrangement; and
    an elevation limit marking superimposed over the sky scene light, the elevation limit marking defining an elevation angle above a horizon of the earth that all the one or more objects in a field of view of the device must remain below so that the user terminal has an unobstructed view of the sky in all azimuthal directions.

2. The device of claim 1, wherein the elevation angle defined by the elevation limit marking comprises a maximum elevation angle.

3. The device of claim 1, further comprising an image-reflecting surface for reflecting the sky scene light onto the light-collecting lens arrangement.

4. The device of claim 3, wherein the image-reflecting surface or a periphery of the image-reflecting surface defines the elevation limit marking.

5. The device of claim 4, wherein the elevation limit marking has an elliptical shape.

6. The device of claim 1, further comprising an image-reflecting surface for reflecting the sky scene light collimated with the eyepiece lens arrangement, onto a user's eye.

7. The device of claim 1, further comprising an image-reflecting surface for reflecting the sky scene light collected with the light-collecting lens arrangement, onto the eyepiece lens arrangement.

8. The device of claim 7, further comprising a transparent sighting surface, the transparent sighting surface including the elevation limit marking.

9. The device of claim 8, wherein the elevation limit marking has a circular shape.

10. The device of claim 3, wherein the image-reflecting surface comprises a mirror.

11. The device of claim 1, wherein the light-collecting lens arrangement comprises a concave lens.

12. The device of claim 11, wherein the concave lens comprises a simple lens or a compound lens.

13. The device of claim 1, wherein the eyepiece lens arrangement comprises a convex lens.

14. The device of claim 13, wherein the convex lens comprises a simple lens or a compound lens.

15. The device of claim 1, further comprising an auxiliary lens arrangement for extending a field of view of the device.

16. The device of claim 15, wherein auxiliary lens arrangement comprises a convex-concave lens.

17. The device of claim 16, wherein the convex-concave lens comprises a simple lens or a compound lens.

18. The device of claim 1, further comprising a housing, the light collecting lens arrangement and the eyepiece lens arrangement disposed in the housing, the housing, the light collecting lens arrangement and the eyepiece lens arrangement forming an optical unit.

19. The device of claim 18, wherein the auxiliary lens arrangement is disposed in the housing of the optical unit.

20. The device of claim 18, further comprising a base, the optical unit mounted on the base.

21. The device of claim 20, wherein the image-reflecting surface is mounted on the base and optically aligned with the optical unit.

22. The device of claim 21, further comprising a stand, the base mounted on the stand, the stand allowing the base to be rotated relative to the stand.

23. The device of claim 1, wherein if the one or more objects is substantially outside the elevation limit marking, the one or more objects are estimated to be below the elevation angle.

24. The device of claim 1, wherein if a portion of the one or more objects is substantially inside the elevation limit marking, the one or more objects are estimated to be above the elevation angle.

25. A user terminal comprising a housing, an antenna associated with the housing, and the device of claim 1, disposed on or integrated into the housing.

26. A method for estimating the elevation angle of one or more objects surrounding a user terminal, the method comprising:
    superimposing an elevation limit marking over sky scene light, the elevation limit marking defining an elevation angle above a horizon of the earth that all the one or more objects must remain below so that the user terminal has an unobstructed view of the sky in all azimuthal directions;

collecting the sky scene light from a wide angle with a light-collecting lens arrangement that is disposed on, attached to, integrated with, or disposed adjacent, to the user terminal;

collimating the sky scene light collected by the light-collecting lens arrangement with an eyepiece lens arrangement; and viewing the sky scene light to ascertain the location of each of the one or more objects in the image relative to the elevation limit marking.

27. The method of claim 26, wherein if all the one or more objects are substantially outside the elevation limit marking, the one or more objects are estimated to be below the elevation angle, and wherein if a portion of the one or more objects is substantially inside the elevation limit marking, the portion of the one or more objects is estimated to be above the elevation angle.

28. The device of claim 6, further comprising a transparent sighting surface, the transparent sighting surface including the elevation limit marking.

* * * * *